United States Patent [19]

Brademeyer et al.

[11] 4,208,881
[45] Jun. 24, 1980

[54] QUICK TAKE-UP MASTER CYLINDER

[75] Inventors: David L. Brademeyer, Dayton; Donald L. Parker, Middletown, both of Ohio

[73] Assignee: General Motors Corporation, Detroit, Mich.

[21] Appl. No.: 927,857

[22] Filed: Jul. 25, 1978

[51] Int. Cl.² .......................... B60T 11/08; F15B 7/04
[52] U.S. Cl. ........................................ 60/578; 60/588; 60/592; 137/513.7
[58] Field of Search ................ 60/562, 574, 578, 588, 60/592; 137/513.7

[56] References Cited

U.S. PATENT DOCUMENTS

| | | | |
|---|---|---|---|
| 2,518,821 | 8/1950 | Roy | 60/578 |
| 2,580,851 | 1/1952 | Seppmann | 60/585 |
| 3,199,299 | 8/1965 | Moyer | 60/588 |
| 3,289,694 | 12/1966 | Frye | 137/513.7 |
| 4,086,770 | 5/1978 | Shaw | 60/562 |
| 4,133,178 | 1/1979 | Brooks, Sr. | 60/578 |

Primary Examiner—Abraham Hershkovitz
Attorney, Agent, or Firm—D. D. McGraw

[57] ABSTRACT

A master cylinder assembly has a low pressure, high volume displacement quick take-up chamber and a high pressure, low volume displacement pressurizing chamber formed by a stepped bore and a stepped piston. A compensation control and blow-off valve unit has a peripheral lip seal type valve providing compensation flow on brake release but preventing flow from the quick take-up chamber during brake apply. A normally closed check valve can open to provide communication between the quick take-up pressurizing chamber and the fluid reservoir. When the pressurizing cup for the high pressure chamber closes its compensation port, the check valve is subjected to the pressure in the quick take-up pressurizing chamber. Initial fluid flow is obtained from the quick take-up chamber past the pressurizing cup into the high pressure chamber. At a predetermined pressure level, arranged to be sufficient to take up lining clearance and initially apply the vehicle brakes, the pressure in the quick take-up chamber opens the normally closed check valve so that fluid from the quick take-up chamber then flows to the reservoir without further pressure buildup in that chamber. As the master cylinder is released, compensation fluid can flow past the peripheral compensation valve to both chambers. When the master cylinder is returned to the fully released position, the check valve is closed. A fluid flow restrictive orifice is provided in parallel with the normally closed check valve to provide a continuous fluid path controlled leak from the quick take-up chamber to the fluid reservoir.

4 Claims, 2 Drawing Figures

QUICK TAKE-UP MASTER CYLINDER

The invention relates to a quick take-up master cylinder and more particularly to one having a compensation control and blow-off valve unit.

A master cylinder embodying the invention utilizes a blow-off valve which permits the buildup of quick take-up pressure to a predetermined point after which the quick take-up chamber is connected to the master cylinder reservoir and the blow-off pressure reduces to substantially, for example to approximately one-half of its original value. This reduces the portion of the master cylinder actuating force required during the remainder of the stroke to force fluid in the quick take-up chamber through the blow-off valve. A similar arrangement is the subject of U.S. patent application Ser. No. 788,627, filed Apr. 18, 1977, over which the invention herein disclosed and claimed is an improvement.

It is a feature of the invention to provide a restrictive fluid flow orifice in parallel with the blow-off valve to provide for temperature compensation and delayed pressure equalization. Pressurized fluid from the quick take-up chamber must pass around the primary pressurizing cup into the high pressure chamber and the brake circuit leading to the vehicle brakes for quick take-up. There is some slight flow through the orifice to the reservoir but this is minimized by limiting the orifice size relative to the amount of fluid being displaced during actuation. Therefore the orifice assures a reasonable flow of quick take-up fluid into the brake system without requiring the added structure in the above noted application.

The quick take-up master cylinder takes up excessive pedal travel by use of a two-stage bore and piston arrangement. It permits the use of increased brake lining clearances, particularly in disc brakes, thus improving gas mileage. It reduces brake pedal effort to manually actuate brakes by using a smaller master cylinder bore diameter for generating high braking pressures after the brake linings have engaged the brake discs or drums. This can remove the requirement of power brake boosters for some cars.

The master cylinder has a stepped bore and a stepped piston defining a large volume chamber and a smaller volume chamber. The large chamber is effective at the beginning of the stroke and in the lower pressure range. It displaces a large volume of fluid at relatively low pressure, which takes up brake lining clearances with a relatively small amount of brake pedal travel. Brake fluid is forced from the large volume or quick take-up chamber around the lip of the primary piston seal into the high pressure chamber as the stroke of the master cylinder piston increases in the brake apply direction. Fluid pressure builds up in the quick take-up chamber to a point that causes the blow-off valve to open and permit passage of substantial quantities of fluid from the quick take-up chamber to the master cylinder reservoir. During the return stroke of the master cylinder piston, excess fluid that has passed from the quick take-up chamber is restored by the flow of fluid from the reservoir around the lip of a compensating seal valve. The blow-off valve is held in the closed position when the master cylinder is in the fully released or at-rest position, but the by-pass orifice permits limited passage of brake fluid from the high pressure chamber and the quick take-up chamber into the master cylinder reservoir. Such passage may occur due to temperature changes of the brake fluid or parts of the brake system, for example, providing for delayed pressure equalization.

IN THE DRAWING

Figures 1, 2:
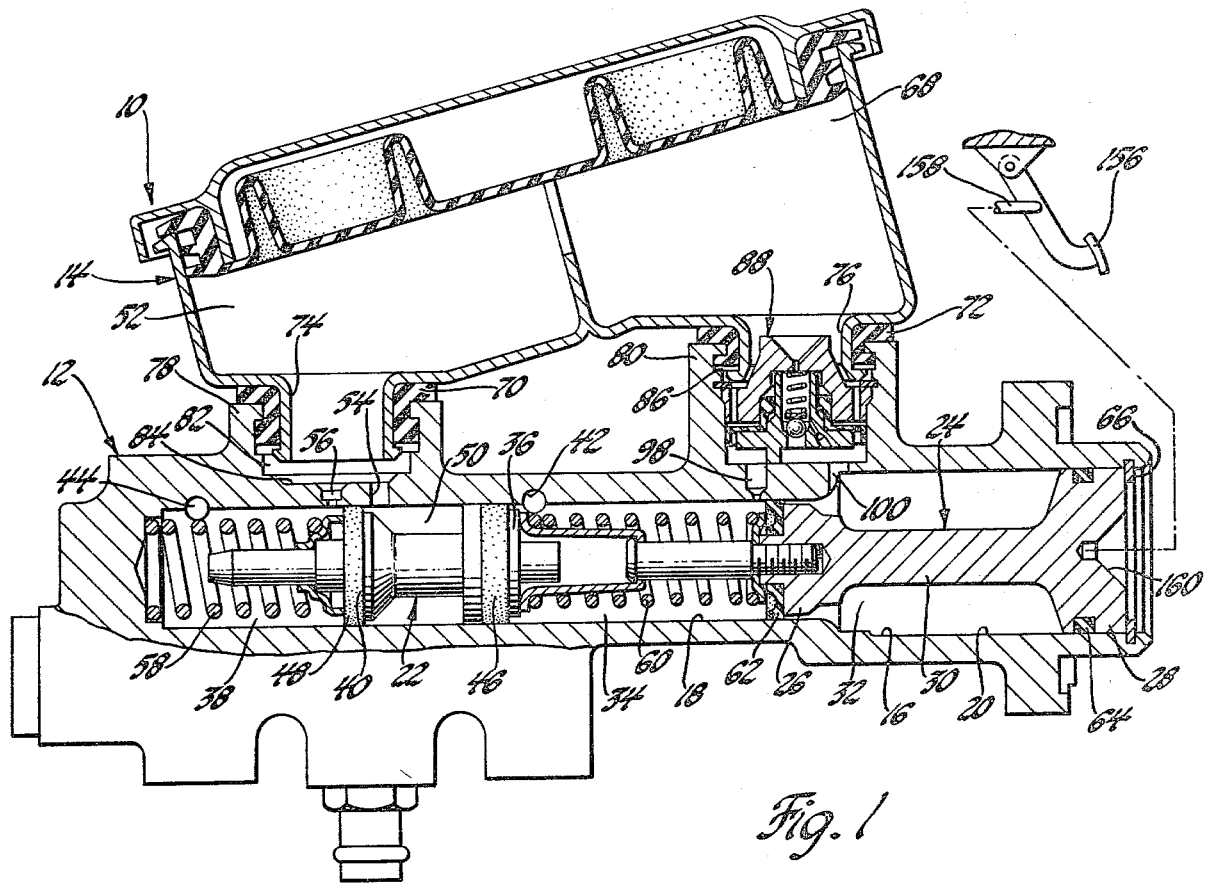
FIG. 1 is a side view of a master cylinder embodying the invention, with parts broken away and in section. The master cylinder is illustrated as being in the fully released position.
FIG. 2 is an enlarged view of the compensation control and blow-off unit of the master cylinder of FIG. 1, with parts broken away and in section.

The master cylinder assembly 10 includes a housing 12 and a reservoir body 14. The housing has a stepped bore 16 formed therein with a smaller diameter forward section 18 and a larger diameter rear section 20. Since the master cylinder is shown as being of the dual circuit type, it is provided with two pressurizing pistons. The forward piston 22 is the secondary piston and is reciprocably received in the forward portion of bore section 18. The rear piston 24 is the primary piston and is a stepped piston. It has a forward piston head 26 formed as a piston land and reciprocably received in the rear portion of bore section 18. It has a rear piston head 28 formed as a land and reciprocably received in bore section 20. The piston heads 26 and 28 are joined by a reduced diameter section 30.

Piston 24 cooperates with bore 16 to define a high volume or quick take-up chamber 32 between piston heads 26 and 28. A high pressure pressurizing chamber 34 is defined by the rear part of bore section 18, piston head 26, and the rear end 36 of secondary piston 22. Another high pressure pressurizing chamber 38 is defined by the forward end 40 of secondary piston 22 and the forward end of bore section 18. An outlet 42 is provided in housing 12 to deliver brake fluid pressurized in chamber 34 to one brake circuit, and an outlet 44 is provided in housing 12 to deliver brake fluid from pressurizing chamber 38 to another brake circuit. Piston 22 has cup seals 46 and 48 respectively mounted on piston ends 36 and 40 in the usual manner. Cup seal 46 will prevent flow from chamber 34 past secondary piston end 36. Cup seal 48 will prevent fluid flow from pressurizing chamber 38 past piston end 40. The chamber 50 between the piston ends 36 and 40 is a compensation chamber which is continually connected to the brake fluid reservoir chamber 52 through compensation port 54. A compensation port 56 provides communication between pressurizing chamber 38 and reservoir chamber 52 when the secondary piston is in the fully released position shown in FIG. 1 so that cup seal 48 uncovers port 56. A piston return spring 58 is provided in chamber 38 and continually urges secondary piston 22 toward the released position. A piston return spring 60 in chamber 34 continually urges piston 24 toward the released position. Spring 60 is a caged spring, as is well-known in the art, which when extended to its permissible limit also establishes the release position of secondary piston 22.

A cup seal 62 is mounted on the forward side of piston head 26 of primary piston 24. Seal 62 is arranged to prevent fluid flow from pressurizing chamber 34 to quick take-up chamber 32, while acting as a check valve which permits fluid flow from chamber 32 to chamber 34 around the outer periphery of piston head 26 and the lip of cup seal 62 while pressure in chamber 32 is greater than pressure in chamber 34. A seal 64 is mounted on piston head 28 to seal the rear end of chamber 32. A piston stop 66 is provided in the open end of the enlarged bore section 20 and forms an abutment engaged by piston head 28 when the master cylidner is in the fully released position.

The reservoir body 14, in addition to fluid chamber 52 for the forward pressurizing chamber 38, has a fluid chamber 68 for the pressurizing chambers 32 and 34. The reservoir body is secured to the master cylinder housing by use of annular retaining and sealing means 70 and 72 which cooperate with short mounting tubes 74 nand 76 formed as a part of reservoir body 14. The retaining and sealing means 70 and 72 and the mounting tubes 74 and 76 are respectively received in annular bosses 78 and 80 formed as a part of housing 12. Boss 78 has a recess 82 opening upwardly to receive retaining and sealing means 70 and mounting tube 74 and in open communication with chamber 52. Compensation ports 54 and 56 open through the bottom surface 84 of recess 82, as well as the side wall of bore section 18.

Boss 80 has a recess 86 which similarly receives retaining and sealing means 72 and mounting tube 76. The lower portion of recess 86 is also a valve unit chamber receiving the compensation control and blow-off valve unit 88. This portion of the master cylinder assembly is in greater detail in FIG. 2. The lower portion of recess 86 forming the valve unit chamber has a side wall 90, a bottom surface 92, a beveled annular shoulder 94 and an annular groove 96 adjacent and above shoulder 94. Compensation port 98 is formed through bottom surface 92 and opens into the rear end of bore section 18. It is so positioned relative to the fully released position of cup seal 62 that it opens into pressurizing chamber 34, but is closed during the initial brake apply movement of piston 24 by the lip of cup seal 62. Compensation port 100 extends through bottom surface 92 and into the larger diameter quick take-up chamber 32.

Unit 88 includes a valve seal member 102 and valve body 104 having a passage 106 formed axially through it. The upper end of passage 106 is a restrictive flow orifice 108 which opens into reservoir chamber 68. The intermediate portion of passage 106 receives the upper part of valve seat member 102, which defines a valve chamber 110. The lower portion of valve chamber 110 defines a passage 114 extending through the lower side of member 102 with the upper end of the passage shaped to provide a valve seat 116. The lower end of passage 114 opens into a lower chamber 118 defined by recessed bottom surface 92, the lower portion of recessed side wall 90, and the undersurface of valve seat member 102. The valve seat member may be provided with one or more castellated supports 120 to maintain chamber 118. A flange 122 around the center part of valve body 104 is beveled to mate with shoulder 94 to axially and radially locate the valve body in the lower portion of recess 86. Retainer 124 fits in groove 96 and over flange 122 to hold the valve body in position against axial movement. A series of circumferentially spaced passages 126 are formed to extend axially through flange 122 and generally axially parallel to the axis of passage 106. A cup seal 128 is peripherally mounted on the lower portion of valve seat member 102, which is smaller in diameter than the diameter of side wall 90, and has a portion sealingly fitting between member 102 and body 104 to close the outer annular portion of the lower end of passage 106. Seal 128 has a lip 130 which is sealingly engageable with recess side wall 90. Passages 126 connect the top portion 132 of the valve unit chamber of recess 86 with the upper side of cup seal 128 so that fluid may flow from chamber 68 through passages 126 and past cup seal lip 130 into chamber 118. Thus the cup seal acts as a valve permitting such flow while preventing flow in the reverse direction, and is a lip type compensating seal.

A ball type check valve 134 is positioned for axial movement in valve chamber 110 of valve seat member 102. The valve 134 is engageable with valve seat 116 to close the lower end of chamber 110 and therefore the inner portion of the lower end of passage 106. A spring 138 provides yieldable means urging valve 134 toward valve seat 116. One end of spring 138 seats on the upper side of valve 134 and the other end of spring 138 seats on a spring seat surface 142 provided by the upper end of passage 110 so as not to interfere with orifice 108. A restrictive flow orifice 144 is formed in member 102 in parallel with valve 134 and its seat 116, maintaining limited continuous fluid communication between valve chamber 110 above valve seat 116 and chamber 118 below the valve seat. Thus the valve and valve seat are restrictively bypassed, the orifice 144 providing a controlled leak accommodating a delayed pressure equalization under a static pressure condition. Restrictive flow orifice or passage 144 provides a greater restriction to fluid flow than does orifice 108.

The master cylinder assembly 10 is arranged to be actuated by a vehicle operator through a brake pedal 156 and a push rod 158 which engages the rear end 160 of primary piston 24. Upon initial brake applying movement of piston 24, the volume of quick take-up chamber 32 decreases and fluid is pushed past cup seal 62 into chamber 34. The cup seal 62 moves to close off compensation port 98 so that pressurization can be obtained in chamber 34. Since check valve 134 is seated on seat 116, fluid flow between quick take-up chamber 32 and reservoir chamber 68 through passage 114 is prevented, and only a very small flow passes through orifice 144. Thus pressurization of the fluid in chamber 32 can occur in a substantially undiminished manner. Fluid is being replaced from chamber 32 at a relatively large volume but low pressure. It flows past cup seal 62, into chamber 34, and through outlet 42 to the brake circuit connected to that outlet. The pressure also acts on the rear end 36 of secondary piston 22 to move that piston forwardly so that its cup seal 48 closes compensation port 56 and fluid pressurization begins in chamber 38. Fluid so pressurized goes through outlet 44 to the brake circuit connected with that outlet. In a brake system where disc brakes are used on the front vehicle wheels only, the disc brake actuating circuit would be connected to outlet 42, thus taking advantage of the high volume of fluid being delivered through that outlet to provide for quick take-up of the brake linings so that they move quickly to engage the brake discs.

The pressure in chamber 32 acts on the lower surface of valve 134 across the effective area of seat 116 while the upper side of the valve is exposed to reservoir pressure, which is usually substantially atmospheric pressure. As the pressure in chamber 32 increases, it reaches a point where the pressure differential acting on valve 134 overcomes the spring closing force of spring 138, moving the valve upwardly. This communicates the quick take-up chamber 32 with reservoir chamber 68 through passages 114, valve chamber 110, and restrictive flow orifice 108. Once the valve moves upwardly so that it disengages from its valve seat 116, the pressure from chamber 32 acts on a greater portion of the lower surface of valve 134 thereby permitting a reduction in pressure in the quick take-up chamber 32 without permitting closure of valve 134. By proportioning the area of the valve exposed to quick take-up pressure when the valve is closed relative to the total valve lower surface area, quick take-up pressure is permitted to drop substantially, for example to approximately one-half of its blow-off pressure value, thereby substantially reducing the amount of brake pedal effort required to displace fluid from chamber 32 as the master cylinder is further actuated in the brake apply mode. Further master cylinder actuation causes pressures to be generated in chambers 34 and 38 at a high rate relative to the amount of stroke since the brake circuits no longer require any appreciable additional fluid volume. The pressurization then depends primarily on the brake pedal force exerted without requiring much brake pedal travel.

Upon brake release, pistons 22 and 24 move rightwardly as seen in FIG. 1. Any required compensating fluid for chamber 38 will flow through port 54 from reservoir chamber 52 to chamber 50 and past cup seal 48. At the same time, fluid is flowing from the brake circuit through outlet 44 into chamber 38. Fluid required for compensation of pressurizing chamber 34 will flow from reservoir chamber 68 through valve chamber top portion 132, passages 126, past lip 130 of cup seal 128, and through lower chamber 118 to compensation port 98. The fluid will then flow past cup seal 62 into chamber 34. Compensation fluid from the reservoir entering lower chamber 118 will also flow through compensation port 100 to quick take-up chamber 32. This chamber requires relatively large amount of compensating fluid since the volume of chamber 32 increases rapidly upon brake release. The passages and chambers provided are sufficient for this purpose.

As the master cylinder reaches its fully released position, secondary piston cup seal 48 will open compensation port 56 so that pressurizing chamber 38 is directly connected through that port to reservoir chamber 52. Cup seal 62 will open compensation port 98 so that pressurizing chamber 34 is directly connected to lower chamber 118. Any temperature changes requiring fluid compensation after the brakes have been released are readily permitted since both pressurizing chambers 34 and 38 have open lines of fluid communication with the reservoir chambers of the reservoir body through orifice 144.

Under some conditions of operation, the vehicle operator may jam the brake pedal 156 in an attempt to obtain a very hard brake apply. Under such circumstances, the pressure increase in quick take-up chamber 32 may be such that the blow-off pressure is reached before sufficient volume can be pushed past cup seal 62 to the brake circuit served by chamber 34 and outlet 42. This causes the blow-off valve 134 to open and permit fluid flow from chamber 32 to reservoir chamber 68. To minimize the loss of fluid volume in this manner, restrictive flow orifice 108 is provided in series with the blow-off valve 134, restricting the amount of fluid flow that would otherwise occur and providing constant brake pedal travel irrespective of the rate of brake pedal apply.

What is claimed is:

1. In a master cylinder having a fluid reservoir, a stepped bore, and a mating stepped piston reciprocably received in said bore, said piston and said bore defining a large diameter low pressure high volume displacing first pressurizing chamber and a smaller diameter high pressure low volume displacing second pressurizing chamber, a compensation control and blow-off valve unit comprising:

a fluid flow sensitive first valve permitting fluid flow therepast from said reservoir to said first chamber and preventing fluid flow therepast in the reverse direction;

a second valve having yieldable means continually urging said second valve closed, said second valve having one side exposed to fluid in said reservoir and another side continuously exposed to fluid in said first chamber of said bore and selectively exposed to fluid in said second chamber of said bore;

said second valve being opened only at a predetermined pressure in the fluid in said first chamber exposed thereto against the urging of said yieldable means;

said second valve including an area exposed to fluid in said first chamber and responsive to a predetermined pressure differential between a higher fluid pressure generated in said first chamber during master cylinder actuation and the lower fluid pressure of said reservoir to open said second valve against the urging of said yieldable means to relieve pressure in said first chamber;

and a continuously open restricted flow passage bypassing said second valve between said reservoir and said first chamber and providing a controlled leak accommodating a delayed pressure equalization between said reservoir and said first chamber under a static pressure condition;

pressure generated in said first chamber during master cylinder actuation therefore being limited so that the master cylinder actuating force is not required to overcome the pressure generated in said first chamber.

2. In a master cylinder having a fluid reservoir, a stepped bore, and a mating stepped piston reciprocably received in said bore, said piston and said bore defining a large diameter low pressure high volume displacing first pressurizing chamber and a smaller diameter high pressure low volume displacing second pressurizing chamber, a compensation control and blow-off valve unit comprising:

a fluid flow sensitive first valve permitting fluid flow therepast from said reservoir to said first chamber and preventing fluid flow therepast in the reverse direction;

a second valve having yieldable means continually urging said second valve closed, said second valve having one side exposed to fluid in said reservoir and another side exposed to fluid in said first chamber of said bore;

said second valve being opened only at a predetermined pressure in the fluid in said first chamber of said bore exposed thereto against the urging of said yieldable means;

said second valve including an area exposed to fluid in said first chamber of said bore and responsive to a predetermined pressure differential between a higher fluid pressure generated in said first chamber during master cylinder actuation and the lower fluid pressure of said reservoir to open said second valve against the urging of said yieldable means to relieve pressure in said first chamber, said area of said second valve exposed to fluid in said first chamber of said bore effectively increasing upon opening of said second valve so that the pressure in said first chamber required to hold said second valve open is substantially less than the pressure in said first chamber required to open said second valve;

and a continuously open restricted flow passage bypassing said second valve between said reservoir and said first chamber and providing a controlled leak accommodating a delayed pressure equalization between said reservoir and said first chamber under a static pressure condition;

pressure generated in said first chamber during master cylinder actuation therefore being limited so that the master cylinder actuating force for further brake actuation after said second valve is open is not required to overcome pressure generated in said first chamber beyond that which is substantially less than the low pressure produced in said first chamber.

3. In a brake actuating master cylinder having a fluid reservoir, a stepped bore, a mating stepped piston reciprocably received in said bore and movable by a brake pedal, said piston and said bore defining a large diameter low pressure high volume displacing first pressurizing chamber and a smaller diameter high pressure low volume displacing second pressurizing chamber, and check valve means on said piston permitting fluid flow from said first chamber to said second chamber, a compensation control and blow-off valve unit comprising:

a fluid flow sensitive first valve permitting fluid flow therepast from said reservoir to said bore first chamber and preventing fluid flow therepast in the reverse direction;

a second valve having yieldable means continually urging said second valve closed, said second valve having one side exposed to fluid in said reservoir and another side exposed to fluid in said bore first chamber;

a restrictive flow orifice fluidly intermediate said second valve one side and said reservoir through which any fluid flowing through said second valve must flow;

said second valve being opened only at a predetermined pressure in the fluid in said bore first chamber exposed thereto against the urging of said yieldable means;

said second valve including an area exposed to fluid in said bore first chamber and responsive to a predetermined pressure differential between a higher fluid pressure generated in said bore first chamber during master cylinder actuation and the lower fluid pressure of said reservoir to open said second valve against the urging of said yieldable means to relieve pressure in said bore first chamber at a maximum flow rate established by said restrictive flow orifice;

and a continuously open restricted flow passage providing a greater restriction to fluid flow than said restrictive flow orifice, said restrictive flow passage bypassing said second valve to permit a highly restrictive controlled leak between said reservoir and said bore first chamber through said restrictive flow orifice and said restrictive flow passage;

pressure generated in said bore first chamber during master cylinder actuation therefore being limited so that the master cylinder actuating force is not required to overcome pressure generated in said bore first chamber beyond the low pressure initially generated therein, said maximum flow rate through said restrictive flow orifice controlling the rate of fluid displacement from said bore first chamber to said reservoir so that a fast and full force brake pedal actuation will direct at least a portion of fluid from said bore first chamber into said bore second chamber through said check valve means instead of directing all of it to said reservoir.

4. In a master cylinder having a fluid reservoir, a master cylinder body with a stepped bore formed therein, and a mating stepped piston received in said bore and actuatable therein in apply and release modes, said bore and said piston defining a large diameter low pressure high volume displacing pressurizing first chamber and a smaller diameter high pressure low volume displacing pressurizing second chamber, an improved compensation control and blow-off unit operable during the apply mode of said piston to selectively vent said first chamber and comprising:

a valve chamber formed in said master cylinder body with a side wall and a bottom surface and a top opening into said reservoir, said bottom surface having first and second compensation ports extending therethrough and into said bore, said first compensation port being continually connected only with said first chamber of said bore and said second compensation port being connected only with said second chamber of said bore when said portion is in the fully released position of said release mode;

a valve assembly including a valve body having a lip type compensating seal extending about the outer periphery thereof and in sealing contact with said valve chamber side wall to permit fluid flow in one direction only;

said valve body including means permitting fluid to pass in said one direction from said reservoir past said compensating seal to said compensation ports and said first chamber as said piston is actuated in said release mode from an actuated position to said fully released position thereof;

said valve body having a passage extending axially therethrough and connecting said reservoir and the portion of said valve chamber between said valve body and said valve chamber bottom surface and having a normally closed check valve therein which when closed prevents flow from said reservoir through said passage to said compensation ports when said piston is in either apply or release modes;

and a continuously open restricted flow passage bypassing said check valve between said reservoir and said first chamber and providing a controlled leak accommodating a delayed pressure equalization between said reservoir and said first chamber under static pressure conditions;

said check valve opening in response to a predetermined blow-off pressure generated in said first chamber during further actuation of said piston from said fully released position in said apply mode to vent said first chamber to said reservoir.

* * * * *

UNITED STATES PATENT AND TRADEMARK OFFICE
CERTIFICATE OF CORRECTION

PATENT NO. : 4,208,881
DATED : June 24, 1980
INVENTOR(S) : David L. Brademeyer et al It is certified that error appears in the above—identified patent and that said Letters Patent are hereby corrected as shown below:

Column 3, line 2, "cylidner" should read cylinder;

line 36, "seal" should read seat.

Column 4, lines 38-39, "replaced" should read displaced.

Column 8, line 31, "portion" should read piston.

Signed and Sealed this

Fourteenth Day of October 1980

[SEAL]

Attest:

SIDNEY A. DIAMOND

Attesting Officer

Commissioner of Patents and Trademarks